United States Patent [19]

Baer

[11] 4,199,493

[45] Apr. 22, 1980

[54] REINFORCED POLYARYLENE ESTERS

[75] Inventor: Massimo Baer, Longmeadow, Mass.

[73] Assignee: Monsanto Company, St. Louis, Mo.

[21] Appl. No.: 924,780

[22] Filed: Jul. 14, 1978

[51] Int. Cl.$^2$ ............................ C08K 7/14; C08K 9/04
[52] U.S. Cl. .................................. 260/40 R; 525/177
[58] Field of Search .............................. 260/40 R, 873

[56] References Cited

U.S. PATENT DOCUMENTS

| | | | |
|---|---|---|---|
| 3,635,879 | 1/1972 | Baer et al. ...................... | 260/42.14 X |
| 3,647,921 | 3/1972 | Berry .................................. | 260/873 |
| 3,792,118 | 2/1974 | Kishikawa .......................... | 260/873 |
| 4,064,196 | 12/1977 | Hazama et al. .................. | 260/40 R X |
| 4,102,864 | 7/1978 | Deex et al. ......................... | 528/173 |
| 4,127,557 | 11/1978 | Deex et al. ........................ | 260/40 R |

*Primary Examiner*—Sandra M. Person
*Attorney, Agent, or Firm*—R. Bruce Blance; W. J. Farrington; S. M. Tarter

[57] ABSTRACT

Molding resins are disclosed which comprise a polyarylene ester containing recurring units derived from 1,2-bis(4-hydroxyphenyl)ethane, an inorganic reinforcing agent and a thermoplastic vinyl addition polymer. The reinforcing agent preferably comprises capsules in which glass fiber strands are encapsulated in collimated array within the thermoplastic vinyl addition polymer.

20 Claims, No Drawings

REINFORCED POLYARYLENE ESTERS

This invention relates to a molding resin, to shaped articles formed from the molding resin and to a method of producing reinforced molding compositions. More particularly, it pertains to molding resin comprising a polyarylene ester containing recurring units derived from 1,2-bis(4-hydroxyphenyl)ethane and a reinforcing agent, to shaped articles formed from such molding resins and to a method of producing such molding resins.

DESCRIPTION OF THE PRIOR ART

Many polyesters have been suggested for use as molding resins and engineering thermoplastics since the earliest practical development of such polymers by Whinfield and Dickson. Although several of such polyesters and copolyesters have found commercial success as film and fiber products, few have been successful as molding resins and engineering thermoplastics. Two of the more successful polyethylene terephthalate and polytetramethylene terephthalate prepared from aliphatic diols and terephthalic acid, suffer from certain deficiencies such as flammability, which can limit their usefulness as engineering thermoplastics.

Recently polyarylene esters from bis(hydroxyphenyl)ethane have been developed and have been found to give superior fire safety performance and to be capable of yielding crystalline compositions which have superior solvent resistance and stress cracking resistance. Such polyesters have been reinforced with reinforcing fillers to improve their resistance to heat distortion and to flow at elevated temperatures. However, the introduction of reinforcing agent into the polyarylene esters can cause such an increase in the melt viscosity of the polyarylene ester composition that the compositions cannot readily be extruded or molded at temperatures below the decomposition point of the polyarylene ester.

SUMMARY OF THE INVENTION

It has now been discovered that molding resins of lower melt viscosity and improved processability are obtained by intimately blending a polyarylene ester, a reinforcing amount of a reinforcing agent and a vinyl addition polymer wherein the polyarylene ester consists essentially of units derived from 1,2-bis(4-hydroxyphenyl)ethane and at least one $C_8$ to $C_{25}$ aromatic dicarboxylic acid, wherein the inherent viscosity of the polyarylene ester at 30° C. determined at a concentration of 0.5 grams polyester per 100 ml solution in a solvent mixture of 60 parts by weight of phenol and 40 parts by weight of sym-tetrachloroethane is at least about 0.5, and the melting point is less than about 350° C. The molding resin comprises an effective amount of vinyl addition polymer for reduction in the melt viscosity of the reinforced polyarylene ester and preferably comprises from about 36 to about 93 parts by weight of polyarylene ester, from about 5 to about 60 parts by weight of reinforcing agent and from about 2 to about 9 parts by weight of vinyl addition polymer wherein the weight ratio of polyarylene ester to vinyl addition polymer is at least about 10:1.

Another aspect of the invention is directed to shaped articles molded from these molding resins and yet another aspect is directed to a process of manufacture of the composite molding resins and shaped articles.

THE PREFERRED EMBODIMENTS

The polyarylene ester component of the molding resin of the present invention is the condensation product of 1,2-bis(4-hydroxyphenyl)ethane and at least one $C_8$ to $C_{25}$ aromatic dicarboxylic acid. The 1,2-bis(4-hydroxyphenyl)ethane can comprise up to about 40 mol percent of at least one $C_6$ to $C_{25}$ diphenol.

While essentially any suitable $C_8$ to $C_{25}$ aromatic dicarboxylic acid and admixture thereof can be used in the preparation of the polyarylene ester, the preferred aromatic dicarboxylic acids comprise at least one acid selected from the group consisting of isophthalic acid, terephthalic acid, 3,3'-, 3,4'- and 4,4'-bibenzoic acids and bis(carboxyphenyl)ethers, bis(carboxyphenyl)sulfides, bis(carboxyphenyl)sulfones, bis(carboxyphenyl)methanes, 1,2-bis(carboxyphenyl)ethanes and 2,2-bis(carboxyphenyl)propanes in which the carboxy groups are in the 3 or 4 positions. A particularly preferred aromatic dicarboxylic acid is isophthalic acid and mixtures thereof. Mixtures of one or more of the aromatic dicarboxylic diacids with minor quantities, generally less than about 25 mol percent, of $C_2$ to $C_{20}$ aliphatic diacids can also be used. The quantities of aliphatic diacids in general are selected so that they do not cause a significant loss in Tg of the resulting polyesters. Preferably the quantity is limited to a loss in Tg of not more than 10° C. The acid or admixture of acids is combined with 1,2-bis(4-hydroxyphenyl)ethane or with 1,2-bis(4-hydroxyphenyl)ethane in admixture with essentially any other suitable diphenol or mixture of diphenols to provide the aromatic polyesters of the present invention. The preferred $C_6$ to $C_{25}$ diphenols comprise at least one diphenol selected from the group consisting of resorcinol, hydroquinone, 3,3'-, 3,4'- and 4,4'- diphenols, and diphenols represented by the formula:

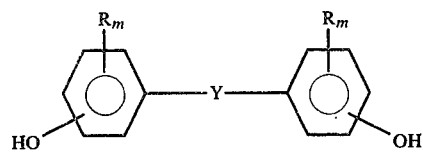

wherein the hydroxyl groups are in the 3- or 4- positions, Y is O, S, $SO_2$, C=O, $CH_2$, $CH(CH_3)$, $C(CH_3)_2$, $(CH_2)$ or $(CH_2)_3$ and R is H or a $C_1$ to $C_4$ alkyl radical and m is 0 to 4. The preferred diphenols include resorcinol, hydroquinone, bis(4-hydroxyphenyl)methane, 1,2-bis(3-hydroxyphenyl)ethane, 1-(3-hydroxyphenyl)-2-(4-hydroxyphenyl)ethane, 2,2-bis(4-hydroxyphenyl)propane, bis(4-hydroxyphenyl)ether, bis(4-hydroxyphenyl)sulfide and bis(4-hydroxyphenyl)sulfone.

While diphenol may contain at least 60 mol percent 1,2-bis(4-hydroxyphenyl)ethane, it is preferred to use a diphenol which comprises at least about 90 mol percent 1,2-bis(4-hydroxyphenyl)ethane because these polyesters generally exhibit a rather rapid rate of crystallization.

The inherent viscosity of the polyesters determined at 30° C., in a solvent combination of 60 parts by weight phenol and 40 parts by weight sym-tetrachloroethane at a concentration of 0.5 g per dl., is at least about 0.5 and is preferably at least about 0.7. The selection of acid and diphenol components is made so that the polyester preferably has a glass transition temperature of at least 100° C., a viscosity at 320° C. determined in a capillary rheometer at a shear rate of 100 $sec^{-1}$ of less than $10^5$ poise and a melting point less than about 350° C. An especially preferred group of polyarylene esters comprises those polyesters obtained by condensation of a diphenol comprising at least 90 mol percent 1,2-bis(4-hydroxyphenyl)ethane and a dicarboxylic acid comprising at least 67 mol percent isophthalic acid. Of this preferred group, one of the more preferred combinations is obtained from 1,2-bis(4-hydroxyphenyl)ethane and isophthalic acid without additional components. The preferences are based on the availability and cost of the acid as well as on the desirable glass transition and melting points of the resulting polyesters. Since molding cycles are preferably rapid, it is desirable that a crystalline polyester crystallize in the short period during which the polymer is cooling in the mold. Thus a molding material for uses where high temperature dimensional stability is important, needs to have a rapid rate of crystallization. The glass transition temperature, the melting point and the rate of crystallization can be determined by means of differential scanning calorimetry as described in copending application Ser. No. 709,469, filed July 28, 1976, now U.S. Pat. No. 4,102,864, which methods are hereby incorporated by reference.

The crystallization rate is expressed as the inverse of the time required for one half of the crystallization exotherm observed when a sample is cooled at a rate of 20° C. per minute. A rate of crystallization of about 0.2 minutes$^{-1}$ or greater as determined by this method is satisfactory in injection molding of polymers because the cooling rate in in the molding operation is generally much faster than the cooling rate used in the determination of rate of crystallization. However, a crystallization rate of about 0.5 minute$^{-1}$ or greater is more preferable and for rapid molding cycles a crystallization rate of about one minute$^{-1}$ or greater is even more preferred.

The polyarylene ester component of the present invention can be produced by any convenient method such as by melt condensation or solvent condensation of mixtures of aromatic dicarboxylic acids and diphenol diesters selected to provide polyarylene esters of the desired fire safety performance and processability. It can be produced by melt or solution polymerization of selected mixtures of phenol esters of aromatic dicarboxylic acids and diphenols and by interfacial polymerization of salts of diphenols and aromatic dicarboxylic acid dihalides. Thus, while the combination is formally a condensate of diacid and diphenol, in practice the reactants are diacids and diphenol esters, or phenyl esters of diacids and diphenols, or salts of diphenols and diacid halides. A preferred method of preparation is the melt condensation of mixtures of aromatic dicarboxylic acids and diphenol diesters. Another preferred method is the melt condensation of aromatic dicarboxylic acids and diphenol diesters to a prepolymer stage of inherent viscosity in the range of about 0.1 to 0.4 followed by solid state polymerization to advance the polymer to an inherent viscosity above about 0.5.

The molding resins of the present invention are prepared by intimately blending the polyarylene ester with the reinforcing agent and the vinyl addition copolymer. In general, any reinforcing agent can be used, for example, fibers, whiskers and platelets of metals such as aluminum, iron, nickel and the like, carbon filaments, silica, metal oxides such as titanium dioxide, zinc oxide and the like, titanate whiskers, silicates, glass beads, flakes and fibers and the like which are used in a reinforcing amount, that is, in an amount sufficient to increase the strength, stiffness, resistance to distortion by heat, or impact strength of the composition. The ratio of polyarylene ester to reinforcing agent is preferably selected so that there are from about 36 to about 93 parts by weight of polyarylene ester and from about 5 to about 60 parts by weight of reinforcing agent. Preferably, the amount of reinforcing agent is in the range of from about 10 to about 40 weight percent of the total composition to achieve a sufficient degree of reinforcement without an excessive increase in melt viscosity.

The preferred reinforcing fillers are of glass and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 1 to about 20 microns but this is not critical to the present invention.

The length of the glass filaments and whether or not they are bundled into fibers and the fibers bundled in turn to yarns, ropes or rovings, or woven into mats, and the like, are also not critical to the invention. However, in preparing the present compositions, it is convenient to use the filamentous glass in the form of chopped strands of from about 0.8 mm to about 20 mm long, preferably from about 1.6 mm to about 6.4 mm and about 0.1 mm to 5 mm wide. In articles molded from the compositions, shorter lengths will be encountered because, during compounding, considerable fragmentation can occur.

The vinyl addition polymer serves to reduce the melt viscosity of the reinforced polyarylene ester composite and this acts as an extrusion aid in the preparation of the molding powder of the present invention and in the preparation of molded articles therefrom. Excessive amounts of the vinyl addition polymer tend to counteract the reinforcing effect of the reinforcing agent. It is therefore, preferred to limit it to amounts up to about 1 part by weight per 10 parts by weight of polyarylene ester, and subject to this restriction the preferred compositions therefore, comprise from about 36 to about 93 parts by weight of polyarylene ester, from about 5 to about 60 parts by weight of reinforcing agent and from about 2 to about 9 parts by weight of vinyl addition polymer. Surprisingly when the vinyl addition polymer is present in such limited amounts, while it decreases the melt viscosity, it does not decrease and may even increase the heat distortion temperature of the solid reinforced molded resin and the resistance to flow of the solid resin at elevated temperatures.

In general the vinyl addition polymer can be prepared from any vinyl monomer or suitable combination of vinyl monomers. Examples of monomers which are polymerizable to thermoplastic resins which may be employed in the practice of this invention include styrene, alpha methyl styrene, vinyl toluene, orthomethyl styrene, para-methylstyrene, ethylstyrene, isopropyl styrene, vinylnaphthalene, etc. Other suitable monomers include vinyl esters such as vinyl acetate, vinyl ethers, maleic anhydride, acrylonitrile, methacrylonitrile, and alkyl methacrylates such as methyl methacrylate, and the like.

In addition, the present invention also contemplates the use of vinyl addition polymers containing in combination a suitable rubber component. Such rubbery components include polybutadiene, nitrile rubbers, polyisoprene, polyisobutylene, natural rubbers, poly(acrylonitrile/butadiene/styrene), ethylene vinyl acetate copolymers, propylene oxide rubbers, etc., and include polyblends, graft copolymers and physical admixtures of such rubbery component in combination with the vinyl addition polymer. Such rubbery compositions are well known to those skilled in the polymer art and need no further explanation here.

The preferred vinyl addition polymers include polymers of styrene, α-methylstyrene, methyl methacrylate, acrylonitrile and methacrylonitrile. Especially preferred are homopolymers and copolymers of styrene, homopolymers and copolymers of α-methylstyrene, homopolymers and copolymers of methyl methacrylate, copolymers of acrylonitrile and copolymers of methacrylonitrile. In these especially preferred systems the amounts of comonomers can be varied over very wide ranges as is well known to those skilled in the art. However, it is preferred to select combinations of monomers so that the glass transition temperature of the polymer is at least 70° C. and even more preferably at least 100° C. Also, the method of polymerization is not critical and can be carried out by conventional solution, emulsion, suspension or bulk polymerization with a suitable catalyst or initiator. The number of average molecular weight of the vinyl addition polymer should be in the range of about 10,000 to about 200,000 and is preferably in the range of about 20,000 to about 80,000.

The reinforcing agent and the vinyl addition polymer may be added separately to the polyarylene ester and blended in a conventional manner to form the molding resin of the invention, e.g., by dry mixing, or by mixing reinforcing agent into the molten polymer in an extruder, in an injection molding machine, on a heated mill or in other suitable mixing equipment. However, when the reinforcing agent is chopped glass fiber strands, it is convenient to add the vinyl addition polymer to the glass fiber strands prior to addition to the polyarylene ester since the polymer protects the chopped glass strands during blending with the polyarylene ester, minimizing segregation, debundling, bridging, haystacking and matting of the glass fiber and aiding the preparation of uniform blends.

Debundling is the term used to describe the loss of integrity of the glass strands and the scattering of the individual microfibers, causing bridging or haystacking configurations (haystacking) in the hopper which feeds the extruder or injection molding machine. As a result of haystacking, the desired feed ratio of glass fibers to resin matrix in the molding or extrusion operation can be upset and an inferior non-uniform product can be produced. Alternatively, matting of the glass fibers can occur with clogging of the machinery causing machine breakdowns and/or inferior products.

Several methods of protecting the glass fiber strands with vinyl addition polymer are available. In one method an endless glass strand is coated with vinyl addition polymer applied as a solution in a suitable solvent or as an emulsion or as a hot melt and the strand is dried and cut to the desired length. In another method, the individual coated strands are gathered into bundles which are fused together by heating to a temperature above the melting point of the vinyl addition polymer and cut to form pellets or granules containing strands in substantially collimated array. In another method, the individual microfibers are protected by absorption of monomer and in situ polymerization. In a preferred method, capsules of vinyl addition polymer containing glass strands in substantially collimated array are prepared by wetting chopped strands of glass fiber with monomer, suspending the strands in an aqueous medium containing a critical amount of a protective colloid, agitating the suspension using a low shear type of agitation which moves the whole suspension mass while avoiding localized high shear agitation, polymerizing the monomer by a suspension polymerization process, recovering the capsules and drying them to remove residual water and monomer. This method is disclosed in U.S. Pat. No. 3,635,879 and is incorporated herein by reference.

The capsules prepared by the method of U.S. Pat. No. 3,635,879 are selected to comprise from about 50 to about 90% by weight of glass. More preferably, the capsules comprise from about 60 to about 85% by weight of glass. Conversely, the capsules comprise from about 10 to about 50% by weight of vinyl addition polymer and more preferably, from about 15 to about 40% by weight of resin. The conditions of preparation of the capsules are selected to provide capsules which pass through a number 2.5 U.S. Standard Screen and are retained on a number 40 U.S. Standard Screen. The more preferred capsules are those which pass through a number 4 screen and are retained on a number 20 screen.

The capsules weigh about 5 to 100 times more than the average weight of one of the original glass strand segments used as the starting material. The preferred capsules weigh about 10 to 50 times more than the average weight of the original glass strand segments.

In addition to the polyarylene ester, the reinforcing agent and the vinyl addition polymer, the molding resins of the present invention can include additives such as colorants, plasticizers, stabilizers, hardeners, lubricants and the like.

Blending of the components of the molding resin of the present invention is carried out in any convenient way, such as by dry mixing pellets or powder of polyarylene ester with capsules of reinforcing agent encapsulated with vinyl addition polymer or by adding reinforcing agent, and vinyl addition polymer to molten polyarylene ester. The polyarylene ester, the reinforcing agent, the vinyl addition polymer and any other additives are preferably as free as possible of water. Mixing is preferably carried out in as short a time as possible to provide a sufficiently intimate and uniform blend. Melt blending is effected at a temperature selected for adequate melt viscosity but insufficient to cause thermal degradation of the resin. The molten blend can be extruded and cut up into molding compounds such as granules, pellets, etc. by conventional techniques.

The molding resins can be molded or extruded in any equipment conveniently used for reinforced thermoplastic compositions e.g., an Arburg machine with temperature in the range of about 250° to about 350° C. and mold temperature about 100° to 150° C. can be used. Depending on the molding properties of the polyarylene ester, the amount of reinforcing filler and the crystallization behavior of the polyarylene ester, those skilled in the art will be able to make the conventional adjustments in molding cycles to accommodate the composition. A wide variety of sheets and shaped articles can thus be made.

The invention is further illustrated but is not intended to be limited by the following examples in which ratios of monomers are mol ratios and all other parts and percentages are by weight unless specified otherwise.

PREPARATION OF POLYARYLENE ESTERS OF 1,2-BIS(4-HYDROXYPHENYL)ETHANE

EXAMPLE A

Poly(1,2-bis(4-hydroxyphenyl)ethane Isophthalate

A charge consisting of 8.2 parts of isophthalic acid and 14.8 parts of 1,2-bis(4-acetoxyphenyl)ethane is placed in a reaction vessel equipped with a stirrer, condenser and receiver. The vessel is evacuated and purged with nitrogen three times. A nitrogen blanket is maintained in the reactor while it is heated to 250° C. for about three hours during which period approximately 3.5 to 4.0 parts of acetic acid distills. Thereupon the vessel is evacuated to a pressure of about 125 mm and heating at 275° C. is continued for one half hour during which period an additional 1 to 1.5 parts of acetic acid distills. The vacuum is then increased to reduce the pressure to about 0.1 to 0.2 mm and the temperature is raised to 290° C. for an additional hour. At this point the reaction mixture becomes so viscous that further stirring is difficult. Heating is stopped, the reaction mixture is again blanketed with nitrogen and allowed to cool. The resultant polymer is light yellow in color, crystalline and demonstrates an inherent viscosity of 0.57 in the phenol-tetrachloroethane solvent.

EXAMPLES B, C, and D

Poly(1,2-bis(4-hydroxyphenyl)ethane Isophthalate

Similar reactions are carried out under the same conditions and with the reactants and equipment described in Example A except that after the initial three hour period the temperature is raised to 275° C. and the pressure is reduced to 125 mm for 30 minutes. Thereafter, the temperature is raised to 290° C. during the final period at high vacuum of 0.1 to 0.2 mm. The resultant polymers B, C, and D demonstrate inherent viscosities of 0.74, 0.85 and 0.95. The higher inherent viscosities are obtained by increasing the final heating period. The polyesters are crystalline, opaque and melt at 290° C. The polymer melts are extruded and chopped to provide pellets approximately 3 mm in length and 1.5 mm in diameter.

PREPARATION OF GLASS CONCENTRATE CAPSULES

EXAMPLE E

A 3 liter vertical-type autoclave equipped with a reflux condenser, a thermometer, an anchor-type stirrer and baffles is used. This autoclave is first charged with

| | |
|---|---|
| glass fibers (in the form of chopped strands of 3 mm in length) | 210 parts |
| styrene | 103 parts |
| acrylonitrile | 37 parts |
| benzoyl peroxide | 1.4 parts |

The autoclave is then purged with nitrogen gas to displace entrapped air, and allowed to stand for 10 minutes to enable the glass fibers to be wet by the monomeric mixture. Thereafter, the autoclave is further charged with an aqueous solution consisting of:

| | |
|---|---|
| deionized water | 1,750 parts |
| 2-ethylhexyl acrylate/acrylic acid copolymer (as suspending agent) | 2.0 parts |

The autoclave is stirred and heated to raise the contents to 80° C. at which temperature the polymerization is continued for five hours. Thereafter, the unreacted monomer is stripped. The conversion of the monomers to the polymer is 92%.

After the polymerization is complete, the resulting capsules are filtered from the aqueous phase by means of a screen and are washed with water and dried. About 249 parts of capsules of encapsulated glass fiber about 3 mm in length and 2-3 mm in diameter, and about 90 parts of a powdery polymer not containing glass fibers are obtained. The content of glass fibers in the capsules is about 82% by weight. An examination of the cross-section of a capsule showed that the capsule consists of a collimated bundle of a plurality of the glass strands coated with the polymer. The styrene-to-acrylonitrile ratio in the polymer with which the glass fibers are coated is found to be about 80:20. The specific viscosity of the polymer, determined in dimethyl formamide at 25° C. with a solution of 0.1 g. per 100 ml solution is 0.071 and the number average molecular weight is about 45,000.

EXAMPLE F

A reactor is charged with 50 parts glass fibers (in the form of chopped strands of 3 mm in length), supplied by Johns-Manville Co. under the tradename CS-308, 37 parts styrene, 13 parts acrylonitrile, 0.15 part terpinolene and 0.25 part benzoyl peroxide. The reactor is then purged with nitrogen to remove entrapped air and allowed to stand for 10 minutes while the glass fibers are wet by the monomeric mixture. Thereafter, the reactor is further charged with an aqueous solution consisting of 260 parts deionized water and 0.3 part 2-ethylhexyl acrylate/acrylic acid copolymer (as suspending agent). The reactor is sealed and rotated end-over-end for 16 hours at 75° C. The resulting capsules pass through a number 4 U.S. Standard Screen and are retained on a number 15 screen. They weigh 30 to 80 times more than the average weight of the original glass strand segments. Examination of a cross-section of a representative capsule shows a plurality of glass strands in substantially collimated array wherein the microfilms are also encapsulated by the polymer. The specific viscosity of the styrene-acrylonitrile polymer is 0.072 and the number average molecular weight is about 45,000.

EXAMPLE G

Example F is repeated with 85 parts of chopped glass fiber strands, 11.1 parts styrene and 3.9 parts acrylonitrile. The resulting capsules pass through a number 4 U.S. Standard Screen and are retained on a number 16 screen. The specific viscosity of the styrene acrylonitrile copolymer is 0.065 and the number average molecular weight is about 40,000.

PREPARATION OF MOLDING RESINS

EXAMPLE 1

A molding resin is prepared from the polyarylene ester of Example C, a styrene-acrylonitrile copolymer and chopped glass fiber strands. The styrene-acrylonitrile polymer contains styrene and acrylonitrile in the weight ratio of 67.5 to 32.5 and has a number average molecular weight of about 40,000. The chopped glass fiber strands are 4.8 mm in length and comprise bundles of 800 filaments of 3.3 micron diameter. 74.6 Parts of the polyarylene ester, 22.7 parts chopped glass fiber strands and 3.9 parts styrene-acrylonitrile copolymer are blended in a tumble blender and the blend is fed to the hopper of a single stage extruder heated to 320° C. The blend exhibits a strong tendency to plug the hopper so that smooth continuous feeding cannot be maintained. The molten blend is extruded slowly through the strand die and the strand is cooled and chopped to provide pellets of molding resin.

The molding resin is injection molded in a half-ounce Arburg machine at a temperature of 315° C. and a mold temperature of 122° C. to provide test bars. The test bars tested for tensile strength and elongation, ASTM D-638; flexural strength and modulus, ASTM D-790; impart strength ASTM D-256; heat distortion D-648. The data are presented in Table 1.

EXAMPLE 2

Example 1 is repeated with a styrene-acrylonitrile copolymer of number average molecular weight 55,500, containing 77.5 parts styrene and 22.5 parts acrylonitrile. The composition of the molding resin is 75.5% polyarylene ester, 22.5% glass fiber and 2% styrene-acrylonitrile copolymer. Test bars are molded therefrom.

EXAMPLE 3

Example 2 is repeated to obtain a molding resin containing 71.3% polyarylene ester, 22.5% glass fiber and 6.2 parts styrene-acrylonitrile copolymer. Test bars are molded from the molding resin.

EXAMPLE 4

A molding resin is prepared from the polyarylene ester of Example C and the glass fiber capsules of Example G by blending 73.8 parts of polyester pellets with 26.2 parts of capsules in a tumble blender. The blend is fed to the hopper of a single stage extruder heated to 320° C. and the molten blend is extruded slowly through the strand die. In contrast to Examples 1-3 the blend feeds easily to the hopper and no problems of plugging of the hopper or haystacking of the glass fiber are encountered. The strand is cooled and chopped to provide pellets of molding resin which is molded into test bars.

EXAMPLE 5

Example 4 is repeated with the capsules of Example E to give a molding resin comprising 71.2% polyester, 22.5% glass fiber and 6.3% styrene-acrylonitrile copolymer. Test bars are molded therefrom.

EXAMPLE 6

Example 2 is repeated with the polyester of Example D. Test bars are molded from the molding resin.

EXAMPLE 7

Example 3 is repeated with the polyester of Example D. Test bars are molded from the molding resin.

EXAMPLE 8

Example 5 is repeated with the polyester of Example D. Test bars are molded from the molding resin.

EXAMPLE 9-10

For comparative purposes Examples 9 and 10 are prepared by the process of Example 1 from the polyesters of Examples C and D and chopped glass fiber strands without styrene-acrylonitrile copolymer. The composition of the molding powders is 77.5% polyester and 22.5% chopped glass strands. Test bars are molded therefrom and tested as in Example 1. The data are presented in Table 1.

The data demonstrate the increase in physical properties and heat distortion resistance obtained by incorporation of reinforcing agent into polyisophthalates of 1,2-bis(4-hydroxyphenyl)ethane (Example C vs. Example 9; Example D vs. Example 10) and the concomitant undesirable increase in melt viscosity. Introduction of styrene-acrylonitrile copolymer causes a significant reduction in melt viscosity of the reinforced compositions and improvement in processability without appreciable impairment of physical properties. The heat distortion temperature is not impaired and indeed is actually improved in many cases.

TABLE 1

EVALUATION OF GLASS REINFORCED MOLDING RESINS COMPRISING THE POLYISOPHTHALATE OF 1,2-BIS(4-HYDROXYPHENYL)ETHANE

| Example | Composition, wt. % | | | Izod joules/m | Tensile MPa | Elongation % | Modulus MPa | HDT °C. | Melt Visc. K-poise 316° C. 100 sec$^{-1}$ |
|---|---|---|---|---|---|---|---|---|---|
| | Poly-Ester | Glass | SAN | | | | | | |
| C | 100 | — | — | 65 | 63 | 18.0 | 2344 | 135 | 15 |
| 9 | 77.5 | 22.5 | — | 98 | 110 | 3.2 | 7033 | 170 | 21 |
| 1 | 74.6 | 22.5 | 3.9 | 114 | 111 | 3.1 | 6688 | 175 | 16.5 |
| 2 | 75.5 | 22.5 | 2.0 | 108 | 114 | 3.0 | 6412 | 195 | 19 |
| 3 | 71.3 | 22.5 | 6.2 | 92 | 108 | 2.0 | 7102 | 197 | 16.7 |
| 4 | 73.8 | 22.5 | 3.7 | 81 | 108 | 3.0 | 7378 | 170 | 17 |
| 5 | 71.2 | 22.5 | 6.3 | 81 | 94 | 2.2 | 6826 | 177 | 8.2 |
| D | 100 | — | — | — | 76 | 17.0 | 2689 | 141 | 21 |
| 10 | 77.5 | 22.5 | — | — | 106 | 3.5 | 6757 | 170 | 27 |
| 6 | 75.5 | 22.5 | 2.0 | 103 | 110 | 3.4 | 6481 | 165 | 25 |
| 7 | 71.3 | 22.5 | 6.2 | 76 | 108 | 2.7 | 6550 | 170 | 19 |
| 8 | 73.8 | 22.5 | 3.7 | 76 | 106 | 2.1 | 7240 | 180 | 12.3 |

EXAMPLES 11-16

A series of three molding resins (Examples 11-13) is prepared from the polyarylene ester of Example C containing 15, 22.5 and 30 weight percent glass fiber. A similar series is prepared from the polyarylene ester of Example C and the glass capsules of Example F (Example 14) and the glass capsules of Example E (Examples 15 and 16). The molding resins are molded into test bars and their physical properties are determined. The results are presented in Table 2. They demonstrate the increase in modulus and heat distortion resistance achieved with increasing amounts of reinforcing agent and show that the introduction of a small amount of styrene-acrylonitrile copolymer to reduce the melt viscosity, does not impair these properties.

The initial length of the glass fiber strands in Examples 11–13 is 4.7 mm in length. After processing to form the molding resin, the length is about 0.4 mm. The initial length of the glass fiber strands used to prepare the capsules of Examples E and F is 3.1 mm and the final length is 0.5 mm, thus demonstrating that there is a degree of protection afforded to the glass fiber by the encapsulating vinyl addition polymer during processing of the blend in the preparation of the molding resin.

TABLE 2
EVALUATION OF REINFORCED 1,2-BIS(4-HYDROXYPHENYL)ETHANE POLYISOPHTHALATE COMPOSITIONS

| Example | Composition, Wt. % | | | Izod Joules/m | Tensile MPa | Elongation % | Modulus MPa × $10^{-2}$ | HDT °C. |
|---|---|---|---|---|---|---|---|---|
| | Poly-Ester | Glass | SAN | | | | | |
| C | 100 | — | — | 65 | 63 | 18 | 23 | 135 |
| 11 | 85 | 15 | — | 70 | 103 | 4.4 | 52 | 158 |
| 12 | 77.5 | 22.5 | — | 92 | 117 | 3.1 | 69 | 183 |
| 13 | 70 | 30 | — | 103 | 124 | 1.8 | 83 | 204 |
| 14 | 77.4 | 15 | 7.6 | 60 | 70 | 1.6 | 54 | 181 |
| 15 | 71.2 | 22.5 | 6.3 | 81 | 97 | 1.8 | 72 | 205 |
| 16 | 61.6 | 30 | 8.4 | 108 | 85 | 1.1 | 89 | 219 |

EXAMPLE 17

Example 1 is repeated with an α-methylstyrene acrylonitrile copolymer in place of the styrene-acrylonitrile copolymer. The molding resin so obtained has a significantly lower melt viscosity than the molding resin of Example 9, without sacrifice in physical properties of the molded sample.

EXAMPLE 18

Example 1 is repeated with poly(methyl methacrylate) in place of the styrene-acrylonitrile copolymer. The molding resin so obtained has a significantly lower melt viscosity than the molding resin of Example 9, without sacrifice in the physical properties of the molded sample.

What is claimed is:

1. A molding resin comprising an intimate blend of a polyacrylene ester, a reinforcing agent and a vinyl addition polymer wherein the polyarylene ester consists essentially of units derived from 1,2-bis(4-hydroxyphenyl)ethane and at least one $C_8$ to $C_{25}$ aromatic dicarboxylic acid, wherein the inherent viscosity of the polyarylene ester at 30° C. determined at a concentration of 0.5 grams polyester per 100 ml solution in a solvent mixture of 60 parts by weight of phenol and 40 parts by weight of sym-tetrachloroethane is at least about 0.5, the melting point is less than about 350° C. and the rate of crystallization is at least about 0.2 minutes$^{-1}$, and wherein the reinforcing agent is present in an amount effective to reinforce the polyarylene ester and the vinyl addition polymer is present in an amount effective to reduce the melt viscosity of the reinforced polyarylene ester.

2. The molding resin of claim 1 wherein the vinyl addition polymer has a glass transition temperature of at least 70° C. and a number average molecular weight in the range of about 10,000 to about 200,000.

3. The molding resin of claim 2 wherein the vinyl addition polymer has a number average molecular weight in the range of about 20,000 to about 80,000.

4. The molding resin of claims 2 or 3 wherein the vinyl addition polymer is selected from the group consisting of homopolymers and copolymers of styrene, homopolymers and copolymers of α-methylstyrene, homopolymers and copolymers of methyl methacrylate, copolymers of acrylonitrile and copolymers of methacrylonitrile.

5. The molding resin of claim 4 comprising an intimate blend of from about 36 to about 93 parts by weight of polyarylene ester, from about 5 to about 60 parts by weight of reinforcing agent and from about 2 to about 9 parts by weight of vinyl addition polymer wherein the weight ratio of polyarylene ester to vinyl addition polymer is at least 10:1.

6. The molding resin of claim 5 wherein the reinforcing agent is glass fiber.

7. The molding resin of claim 6 comprising an intimate blend of the polyarylene ester and glass fiber capsules wherein the glass fiber capsules contain the vinyl addition polymer as the encapsulating agent and the weight ratio of glass to vinyl addition polymer is in the range of about 1:1 to about 9:1.

8. The molding resin of claim 5 wherein the aromatic dicarboxylic acid is selected from the group consisting of isophthalic acid, terephthalic acid, t-butyl-isophthalic acid, 3,3'-, 3,4'- and 4,4'-bibenzoic acids and bis(carboxyphenyl)ethers, bis(carboxyphenyl)sulfides, bis(carboxyphenyl)sulfones, bis(carboxyphenyl)methanes, 1,2-bis(carboxyphenyl)ethanes, and 2,2-bis(4-carboxyphenyl)propanes, wherein the carboxy groups are in the 3- or 4-positions.

9. The molding resin of claim 7 wherein the aromatic dicarboxylic acid is selected from the group consisting of isophthalic acid, terephthalic acid, t-butyl-isophthalic acid, 3,3'-, 3,4'- and 4,4'-bibenzoic acids and bis(carboxyphenyl)ethers, bis(carboxyphenyl)sulfides, bis(carboxyphenyl)sulfones, bis(carboxyphenyl)methanes, 1,2-bis(carboxyphenyl)ethanes, and 2,2-bis(4-carboxyphenyl)propanes, wherein the carboxy groups are in the 3- or 4- positions.

10. The molding resin of claim 5 wherein the polyarylene ester consists essentially of recurring units represented by the formula

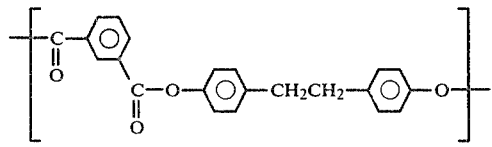

11. The molding resin of claim 7 wherein the polyarylene ester consists essentially of recurring units represented by the formula

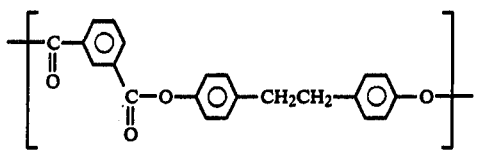

12. A molded article formed from the molding resin of claim 1.

13. A molded article formed from the molding resin of claim 5.

14. A molded article formed from the molding resin of claim 7.

15. A molded article formed from the molding resin of claim 10.

16. A molded article formed from the molding resin of claim 11.

17. A process of preparing a reinforced molding resin comprising intimately melt blending a polyarylene ester and a reinforcing amount of a glass fiber reinforcing agent encapsulated in a vinyl addition polymer, wherein the polyarylene ester consists essentially of units derived from 1,2-bis(4-hydroxyphenyl)ethane and at least one $C_8$ to $C_{25}$ aromatic dicarboxylic acid, wherein the inherent viscosity of the polyarylene ester at 30° C. determined at a concentration of 0.5 grams polyester per 100 ml solution in a solvent mixture of 60 parts by weight of phenol and 40 parts by weight of sym-tetrachloroethane is at least about 0.5 and the melting point is less than about 350° C. and wherein the weight ratio of polyarylene ester to vinyl addition polymer is at least about 10:1.

18. The process of claim 17 wherein the vinyl addition polymer is selected from the group consisting of homopolymers and copolymers of styrene, homopolymers and copolymers of α-methylstyrene, homopolymers and copolymers of methyl methacrylate, copolymers of acrylonitrile and copolymers of methacrylonitrile.

19. The process of claim 18 wherein the glass fiber capsules comprise glass strands having a length in the range of from about 0.8 mm to about 20 mm in substantially collimated array within the vinyl addition polymer.

20. The process of claim 19 wherein the weight ratio of glass fiber to vinyl addition polymer is in the range of about 1:1 to about 9:1 and the resulting reinforced molding resin comprises from about 36 to about 93 parts by weight polyarylene ester, from about 5 to about 60 parts by weight of glass fiber and from about 2 to about 9 parts by weight of vinyl addition polymer.

* * * * *